United States Patent
Li

(10) Patent No.: US 11,635,985 B2
(45) Date of Patent: Apr. 25, 2023

(54) USING DEGREE OF COMPLETENESS OF REAL-TIME DATA TO MAXIMIZE PRODUCT REVENUE

(71) Applicant: Alibaba Group Holding Limited, Grand Cayman (KY)

(72) Inventor: Guozhong Li, Zhejiang (CN)

(73) Assignee: Alibaba Group Holding Limited, George Town (KY)

( * ) Notice: Subject to any disclaimer, the term of this patent is extended or adjusted under 35 U.S.C. 154(b) by 554 days.

(21) Appl. No.: 16/457,540

(22) Filed: Jun. 28, 2019

(65) Prior Publication Data

US 2019/0324794 A1 Oct. 24, 2019

Related U.S. Application Data

(63) Continuation of application No. PCT/CN2017/117082, filed on Dec. 19, 2017.

(30) Foreign Application Priority Data

Dec. 30, 2016 (CN) .......................... 201611270978.5

(51) Int. Cl.
G06F 9/48 (2006.01)
G06F 9/50 (2006.01)

(52) U.S. Cl.
CPC ............ G06F 9/485 (2013.01); G06F 9/5072 (2013.01)

(58) Field of Classification Search
CPC ........ G06F 9/485; G06F 9/5072; G06F 11/34; G06F 16/24568; G06F 11/30; G06F 11/3466
See application file for complete search history.

(56) References Cited

U.S. PATENT DOCUMENTS

| 6,035,297 A | 3/2000 | Van Huben et al. |
| 6,526,044 B1 | 2/2003 | Cookmeyer, II et al. |

(Continued)

FOREIGN PATENT DOCUMENTS

| CN | 101170454 A | 4/2008 |
| CN | 103262042 A | 8/2013 |

(Continued)

OTHER PUBLICATIONS

Chinese Office Action dated Sep. 27, 2020 for Chinese Patent Application No. 201611270978.5, a foreign counterpart to U.S. Appl. No. 16/457,540, 18 pages.

(Continued)

*Primary Examiner* — Benjamin C Wu
(74) *Attorney, Agent, or Firm* — Lee & Hayes, P.C.

(57) ABSTRACT

A real-time data processing method and an apparatus thereof are provided. The method includes collecting real-time data received by one or more nodes in a distributed system; aggregating real-time data that satisfies a same predetermined condition on all the nodes to obtain a total amount of real-time data corresponding to the same predetermined condition, wherein the predetermined condition is used for representing a time at which the real-time data is collected; and calculating a degree of completeness of the real-time data that satisfies the same predetermined condition, wherein the degree of completeness is used for indicating a ratio between processed real-time data that satisfies the same predetermined conditions and the real-time data aggregated on all the nodes. Using the present disclosure, problems caused by failing to know a progress of real-time data processing in existing technologies are resolved, thereby adding a dimension of evaluation of the real-time data processing.

20 Claims, 9 Drawing Sheets

(56) References Cited

U.S. PATENT DOCUMENTS

| | | |
|---|---|---|
| 8,606,594 B2 | 12/2013 | Stern et al. |
| 9,176,966 B2 | 11/2015 | Silverstein et al. |
| 2002/0091991 A1 | 7/2002 | Castro |
| 2003/0115195 A1 | 6/2003 | Fogel et al. |
| 2006/0013473 A1 | 1/2006 | Woodfill et al. |
| 2008/0244008 A1 | 10/2008 | Wilkinson et al. |
| 2009/0138415 A1 | 5/2009 | Lancaster |
| 2012/0263072 A1* | 10/2012 | Wu ................ H04L 41/142 370/253 |
| 2012/0284118 A1* | 11/2012 | Mamich, Jr. ....... G06Q 30/0261 705/14.58 |
| 2016/0103665 A1* | 4/2016 | Liu ................. G06F 11/3644 717/158 |
| 2017/0082436 A1 | 3/2017 | Siercks et al. |
| 2021/0200612 A1* | 7/2021 | Martyanov ........... G06F 40/279 |

FOREIGN PATENT DOCUMENTS

| | | |
|---|---|---|
| CN | 103825930 A | 5/2014 |
| CN | 104331270 | 2/2015 |
| CN | 104468569 | 3/2015 |
| CN | 105812202 A | 7/2016 |
| JP | 2004021744 A | 1/2004 |
| JP | 2014179000 A | 9/2014 |

OTHER PUBLICATIONS

Chinese Search Report dated Sep. 18, 2020 for Chinese Patent Application No. 201611270978.5, a foreign counterpart to U.S. Appl. No. 16/457,540, 2 pages.

Chinese Office Action dated Apr. 2, 2021 for Chinese Patent Application No. 201611270978.5, a foreign counterpart to U.S. Appl. No. 16/457,540, 24 pages.

Japanese Office Action dated Nov. 2, 2021 for Japanese Patent Application No. 2019-535921, a foreign counterpart to U.S. Appl. No. 16/457,540, 7 pages.

* cited by examiner

USING DEGREE OF COMPLETENESS OF REAL-TIME DATA TO MAXIMIZE PRODUCT REVENUE

CROSS REFERENCE TO RELATED PATENT APPLICATIONS

This application claims priority to and is a continuation of PCT Patent Application No. PCT/CN2017/117082 filed on 19 Dec. 2017, and is related to and claims priority to Chinese Patent Application No. 201611270978.5, filed on 30 Dec. 2016, entitled "Real-Time Data Processing Method and Apparatus," which are hereby incorporated by reference in their entirety.

TECHNICAL FIELD

The present disclosure relates to the field of data processing, and particularly to real-time data processing methods and apparatuses.

BACKGROUND

In an existing real-time data computing field, stream data is continuous, and a beginning thereof is unknown. Therefore, data collected in real time changes in real time. Since data collected in real time is constantly changing, a service party that uses these pieces of data has no sense of a processing progress of these pieces of data. As such, it is impossible to make some decisive behavior based on these pieces of data. For example, a sales amount within preset minutes of collection is constantly changing, and a decision maker cannot determine whether to make changes to a sales strategy based on such data. For another example, if real-time data in an alarm monitoring system is constantly changing, the system cannot make an accurate alarm action based on the data. In other words, no parameters can be used to evaluate a processing progress of real-time data in existing technologies.

Currently, commonly used real-time data is processed in two ways as follows:

As shown in FIG. 1, a warning is given if the number of errors is more than 100 in a one-minute log. For example, 100 counts come in 4 individual occasions in one minute, i.e., 25 in each time.

For a first scheme, as shown in FIG. 2, a calculation is performed each time when 25 counts arrive, and the calculation is performed again for a second occasion. Real-time data is processed by such manner of accumulation. The data is stored in a database each time after processing is completed. Specifically, every 25 counts immediately go through a real-time calculation engine and then a memory, and finally reach a database, i.e., from a data source all the way to the database. Currently, the first scheme is the mostly used one in the industry because the integrity of the data can be guaranteed. However, a downside is that the data in the database will constantly change, and so an accurate decision cannot be made.

For a second scheme, as shown in FIG. 3, an expected timeout period may be specified in advance, for example, a 2-minute timeout. Assume 4 occasions of 25 counts are come from 4 time periods. The first 3 occasions arrive within 2 minutes, and the 4th occasion arrives after these 2 minutes. This type of scheme will only record 75 counts of the first three occasions, and storing into a database is performed only one time. Specifically, a memory in FIG. 3 will wait 2 minutes, and storing into the database is performed only after such 2 minutes. For a database, an advantage thereof is that, as long as there is data, it will not change any more. A decision can be made directly based on such data. For example, if a transaction amount is reduced, a brand in an advertising space is immediately changed, which may recover the transaction amount in the fastest time. However, a disadvantage of this scheme is that data that has passed the timeout period will be lost (the 25 counts of the fourth time as shown by a dotted line in the figure), and so an error exists.

No effective solution has been proposed so far for the problems caused by a failure in knowing a progress of real-time data processing in the existing technologies.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Embodiments of the present disclosure provide a real-time data processing method and an apparatus thereof, to at least solve the problems caused by a failure in knowing a progress of real-time data processing.

According to the embodiments of the present disclosure, a real-time data processing method is provided. The method includes collecting real-time data received by one or more nodes in a distributed system; performing an aggregation of real-time data that satisfies a same predetermined condition on all the nodes to obtain a total amount of real-time data corresponding to the same predetermined condition, wherein the predetermined condition is used for representing a time at which the real-time data is collected; and calculating a degree of completeness of the real-time data that satisfies the same predetermined condition, wherein the degree of completeness is used for indicating a ratio between processed real-time data that satisfies the same predetermined conditions and the real-time data aggregated on all the nodes.

According to the embodiments of the present disclosure, a real-time data processing apparatus is also provided. The processing apparatus includes a collection module configured to collect real-time data received by one or more nodes in a distributed system; an aggregation module configured to aggregate real-time data that satisfies a same predetermined condition on all the nodes to obtain a total amount of real-time data corresponding to the same predetermined condition, wherein the predetermined condition is used for representing a time at which the real-time data is collected; and a calculation module configured to calculate a degree of completeness of the real-time data that satisfies the same predetermined condition, wherein the degree of completeness is used for indicating a ratio between processed real-time data that satisfies the same predetermined conditions and the real-time data aggregated on all the nodes.

In the embodiments of the present disclosure, real-time data received by one or more nodes in a distributed system is collected, real-time data satisfying a same predetermined condition on all the nodes is aggregated, and a total amount of real-time data corresponding to the same predetermined condition is obtained. A degree of completeness of the real-time data satisfying the same predetermined condition is calculated, thereby realizing a calculation of the degree of completeness of the real-time data.

It is easy to note that a parameter, i.e., a degree of completeness, is introduced in real-time data processing. Through this degree of completeness, a progress of real-time data processing can be known. The degree of completeness is used for indicating a proportion occupied by processed real-time data that satisfies a predetermined condition with respect to a progress of aggregated real-time data that is processed. After a degree of completeness is introduced, real-time data can be collected and the collected real-time data can be aggregated. Real-time data satisfying a predetermined condition is then obtained from the aggregated real-time data, and the degree of completeness of the real-time data satisfying the predetermined condition can thereby be calculated, thus achieving an effect of adding an evaluation dimension for real-time data processing.

Therefore, the embodiments of the present disclosure solve the technical problems of failing to know a progress of real-time data processing in the existing technologies.

BRIEF DESCRIPTION OF THE DRAWINGS

The drawings described herein are intended to enable a further understanding of the present disclosure, and are intended to be a part of the present disclosure. Illustrative embodiments and a description thereof are used for describing the present disclosure, and are not to be construed as improper limitations to the present disclosure. In the drawing.

DETAILED DESCRIPTION

Figure 1:
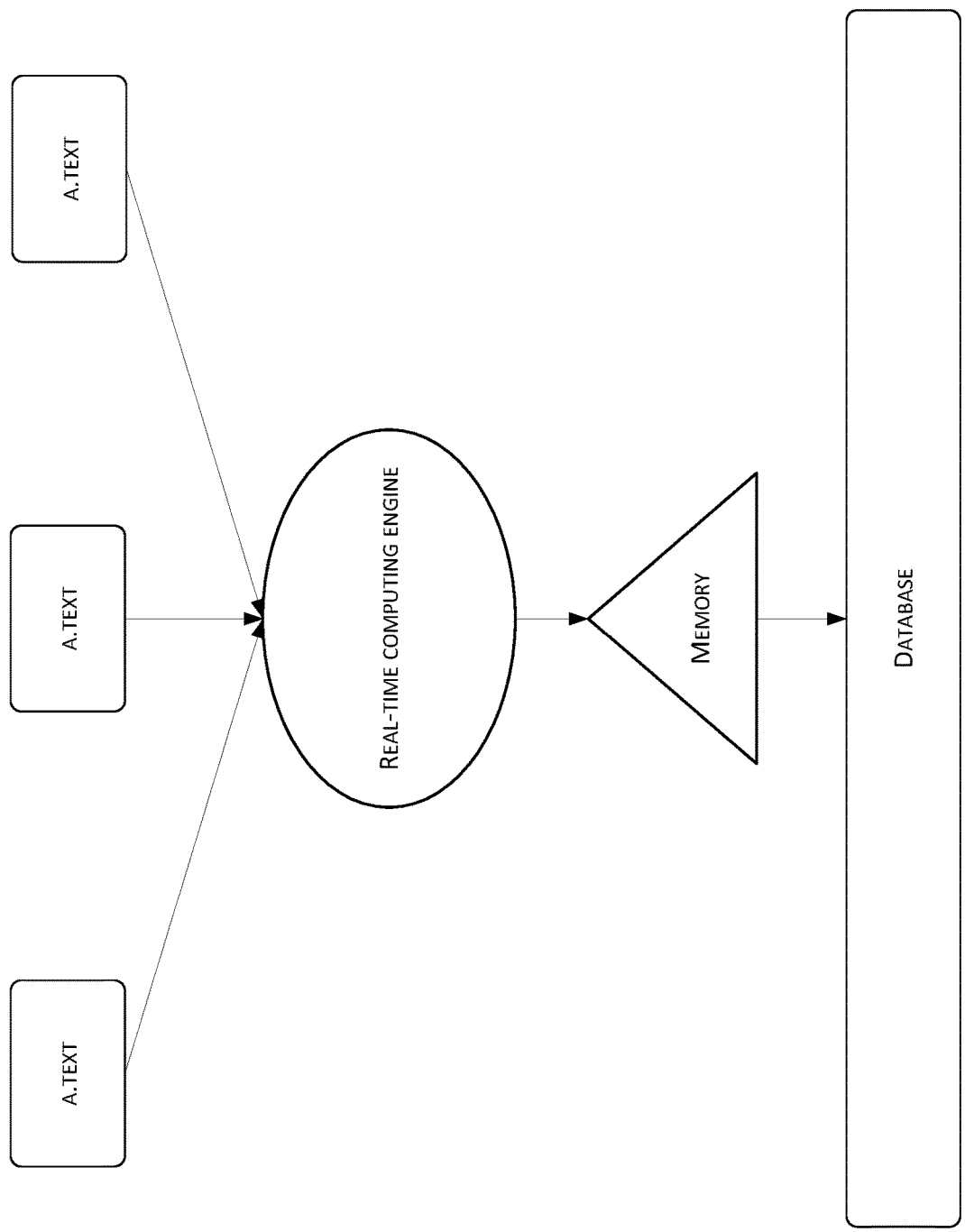
FIG. 1 is a schematic diagram of a real-time data processing method according to the existing technologies.
Figure 2:
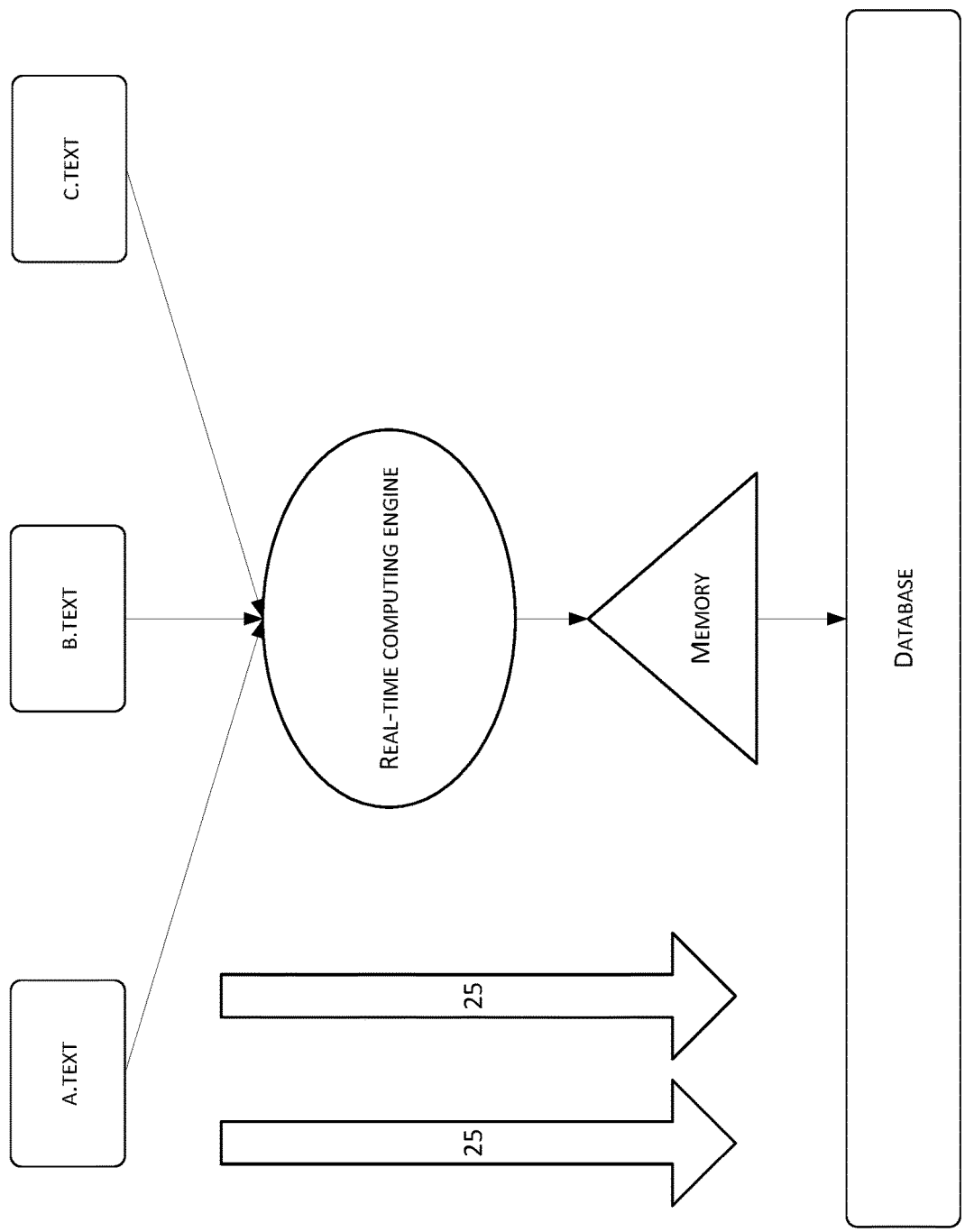
FIG. 2 is a schematic diagram of a first real-time data processing method according to the existing technologies.
Figure 3:
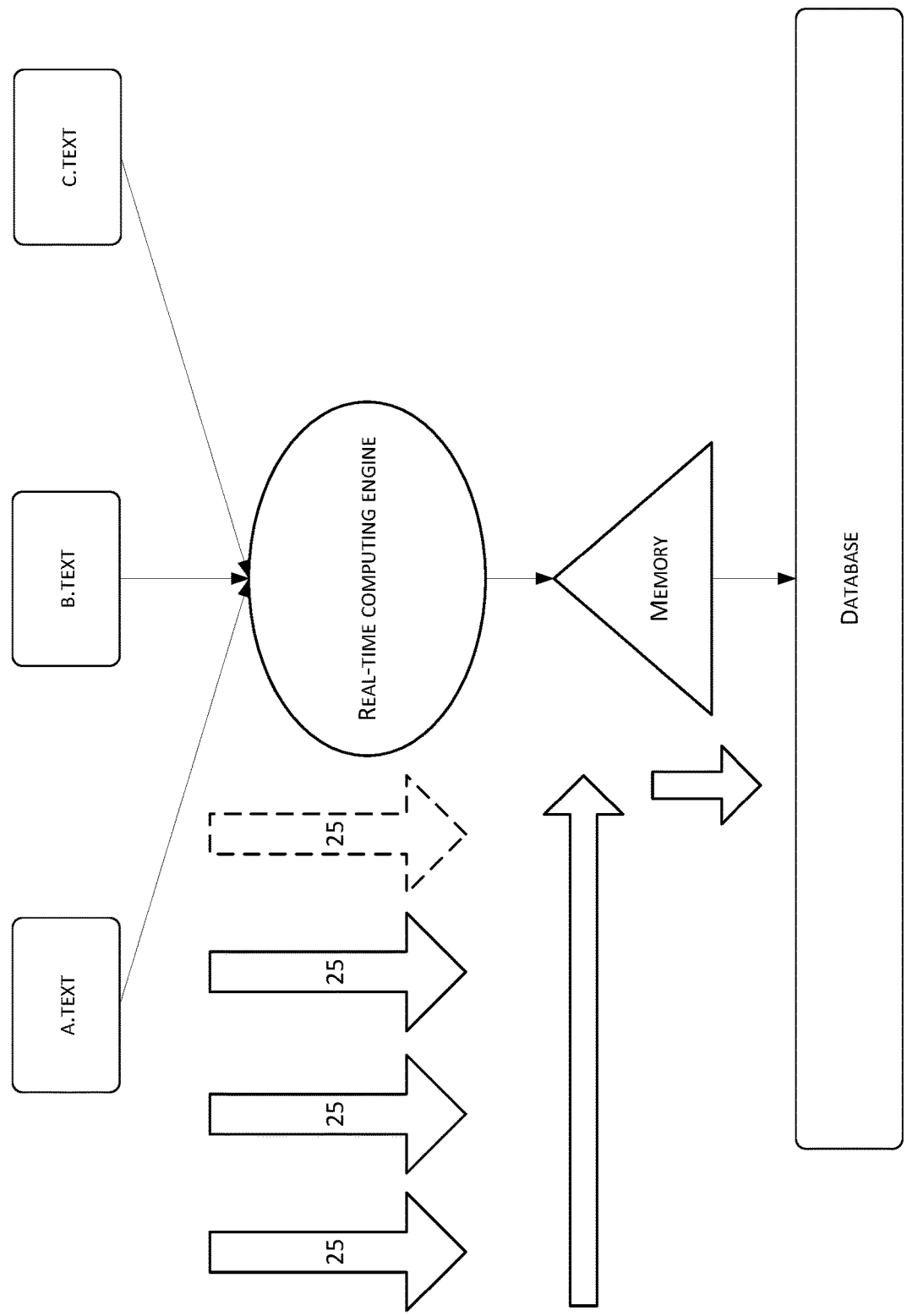
FIG. 3 is a schematic diagram of a second real-time data processing method according to the existing technologies.

The technical solutions in the embodiments of the present disclosure are clearly and completely described hereinafter with reference to the accompanying drawings in the embodiments of the present disclosure. Apparently, the described embodiments merely represent some and not all of the embodiments of the present disclosure. All other embodiments obtained by one of ordinary skill in the art based on the embodiments of the present disclosure without making any inventive effort shall fall within the scope of protection of the present disclosure.

It should be noted that terms "first", "second" and the like in the specification and claims of the present disclosure and the drawings are used for distinguishing similar objects, and are not necessarily used for describing a specific sequence or order. It should be understood that data so used may be interchanged whenever appropriate, so that the embodiments of the present disclosure described herein can be implemented in a sequence other than those illustrated or described herein. In addition, terms "including" and "containing" and any variations thereof are intended to cover a non-exclusive inclusion. For example, a process, method, system, product, or device that includes a series of operations or units is not necessarily limited to those operations or units explicitly listed, and may include other operations or units that are not explicitly listed or that are inherent to such process, method, product or device.

First Embodiment

According to the embodiments of the present disclosure, an embodiment of a real-time data processing method is provided. It should be noted that operations illustrated in a flowchart of the accompanying drawings may be executed in a computer system such as a set of computer executable instructions. Furthermore, although a logical order is shown in the flowchart, in some cases, operations may be performed in an order different from the one that is shown or described therein.

Method embodiments provided by the embodiments of the present disclosure may be processed on a server. In order to provide a better usage experience, a processing result query service may also be provided. For example, an operation result of the server may be viewed through a webpage or a client. The server can be understood as a computer. Apparently, cloud computing has become widely used along with the development of technologies. The methods provided in the embodiments of the present disclosure can also be promoted and used in cloud computing. The computing power of terminals is also enhanced with the development of technologies. When a terminal obtains corresponding data, a calculation can be performed thereon. For example, a terminal may include, but is not limited to, a mobile phone, a tablet computer, and other portable devices. However, deploying the following embodiments on a server is an exemplary option currently.

Under current technical conditions, hardware architectures that servers, terminals, and cloud computing rely on are similar, and can be regarded as a type of computing devices. The embodiments of the present disclosure can be implemented in such computing device. With the development of technologies, the hardware architecture of computing devices has changed, or a new architecture for the computing devices has appeared. The following embodiments of the present disclosure can also be implemented. The architecture of a computing device in FIG. 4 is used hereinafter as an example for description.

Figure 4:
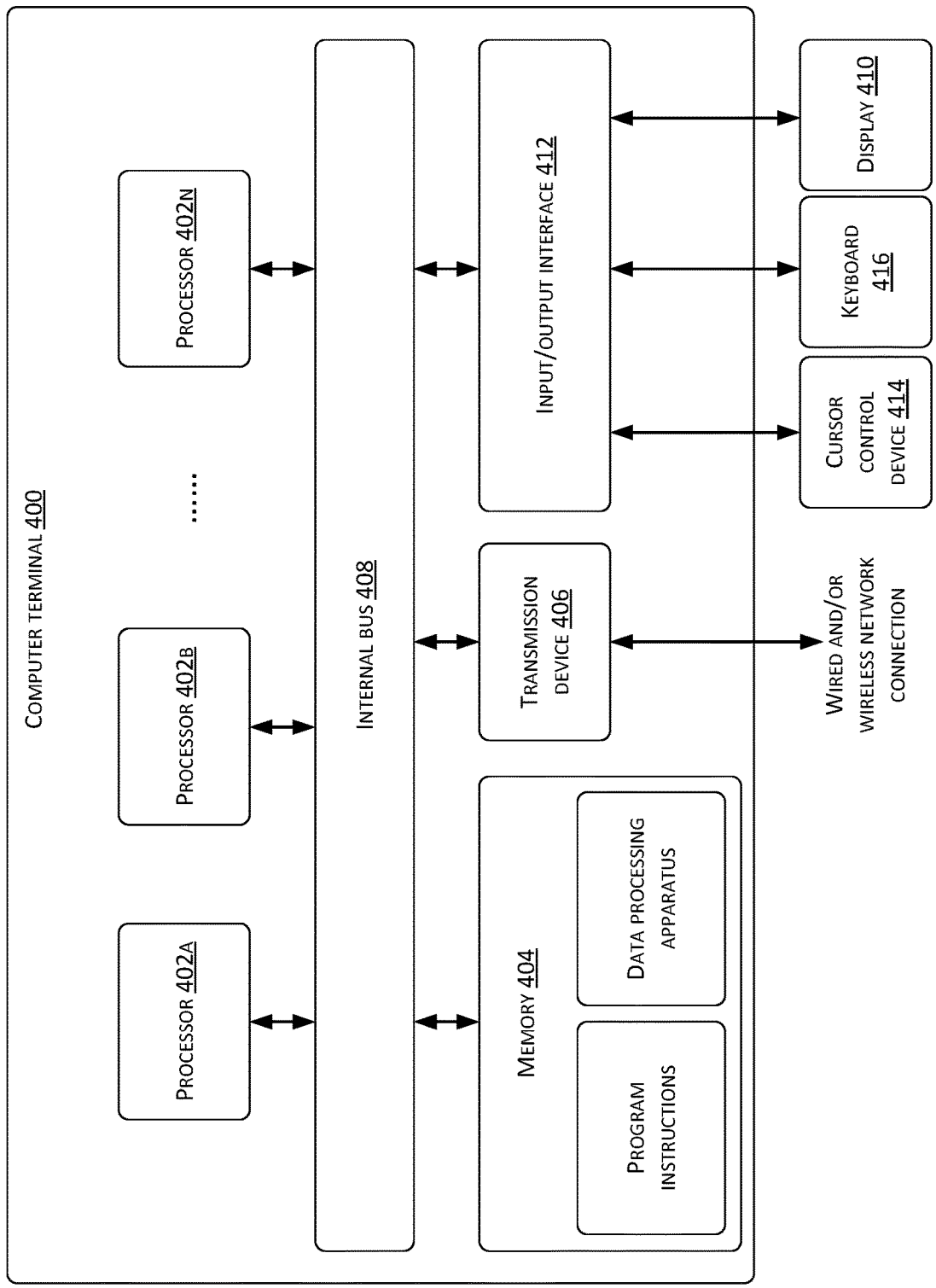
FIG. 4 is a block diagram showing a hardware structure of a computing device of a real-time data processing method according to an embodiment of the present disclosure.

FIG. 4 is a block diagram showing a hardware structure of a computing device for a real-time data processing method according to an embodiment of the present disclosure. As shown in FIG. 4, a computer terminal 400 may include one or more (402a, 402b, ..., 402n as shown in the figure) processors 402 (the processor 402 may include, but is not limited to, a processing device such as a microprocessor MCU or a programmable logic device FPGA, etc.), a memory 404 used for storing data, and a transmission device 406 used for communication functions. In some embodiments, the computer terminal 400 may further include an internal bus 408, a display 410, an input/output interface (I/O interface) 412, a universal serial bus (USB) port (which may be included as one of port(s) of an I/O interface), a cursor control device 414, and a keyboard 416. In some embodiments, a network interface, a power supply and/or a camera may also be included. One skilled in the art can understand that the structure shown in FIG. 4 is merely illustrative and does not limit the structure of the above electronic device. For example, the computer terminal 400 may also include more or fewer components than the ones shown in FIG. 4, or have a configuration different from that shown in FIG. 4.

It should be noted that one or more of the processors 402 and/or other data processing circuits may generally be referred herein as "data processing circuits". The data processing circuit may be embodied in whole or in part as software, hardware, firmware or any other combination thereof. Moreover, the data processing circuit can be a single and separate processing module, or incorporated in whole or in part into any of the other components in the computer terminal 400. As involved in the embodiments of the present disclosure, the data processing circuit acts as a processor control (e.g., a selection of a variable resistance terminal path connected to an interface).

The memory 404 can be configured to store software programs and modules of application software, such as program instructions/modules corresponding to the real-time data processing methods in the embodiments of the present disclosure. The processor(s) 402 execute(s) various functional applications and data processing by running software program(s) and module(s) stored in the memory 404. The memory 404 may include a high speed random access memory and may also include a non-volatile memory, such as one or more magnetic storage devices, a flash memory, or other non-volatile solid state storage device. In some examples, the memory 404 may further include storage devices remotely located relative to the processor(s) 402. The remote storage devices can be connected to the mobile terminal 400 via a network. Examples of such network include, but are not limited to, the Internet, an intranet, a local area network, a mobile communication network, and a combination thereof.

The transmission device 406 is used for receiving or transmitting data via a network. Specific examples of the network may include a wireless network provided by a communication provider of the computer terminal 400. In an example, the transmission device 406 includes a Network Interface Controller (NIC) that can be connected to other network devices through a base station to conduct communications with the Internet. In an example, the transmission device 406 may be a Radio Frequency (RF) module used for communicating with the Internet wirelessly.

Examples of the network include, but are not limited to, the Internet, an intranet, a local area network, a mobile communication network, and a combination thereof.

The display may be, for example, a touch screen liquid crystal display (LCD) that enables a user to interact with a user interface of the computer terminal 400 (or mobile device).

It should be noted that, in some optional embodiments, the computer terminal 400 shown in FIG. 4 above may include hardware components (including circuits), software components (including computer codes stored on a computer readable media), or a combination of both hardware and software components. It should be noted that FIG. 4 is merely an example of a specific embodiment, and is intended to show types of components that may be present in the above-described computer device (or mobile device).

Figure 5:
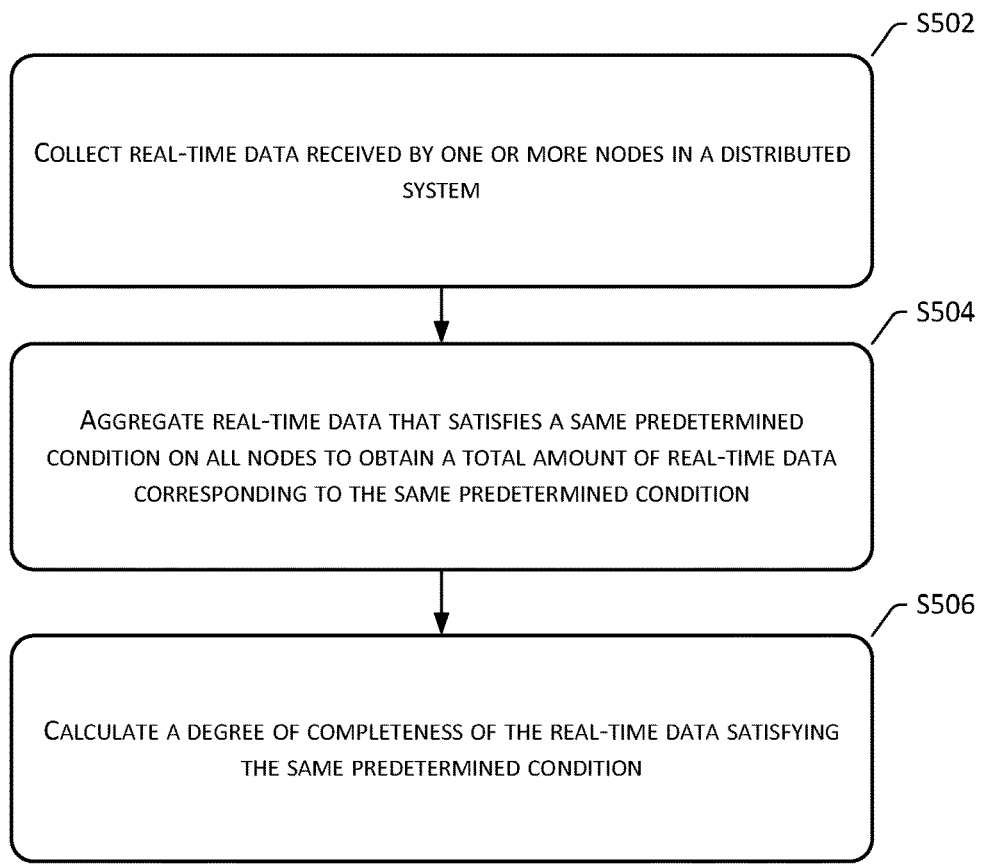
FIG. 5 is a flowchart of a real-time data processing method according to an embodiment of the present disclosure.

In the above operating environment, the embodiments of the present disclosure provide a real-time data processing method. FIG. 5 is a flowchart of a real-time data processing method 500 according to an embodiment of the present disclosure. As shown in FIG. 5, the method may include the following operations.

S502: Collect real-time data received by one or more nodes in a distributed system.

Specifically, the real-time data may be real-time statistical data, and the data is constantly changing with time.

S504: Aggregate real-time data that satisfies a same predetermined condition on all nodes to obtain a total amount of real-time data corresponding to the same predetermined condition, wherein the predetermined condition is used for representing a time when the real-time data is collected.

Specifically, the predetermined condition may be a time limit. The real-time data of the predetermined condition described above may be real-time data collected within a predetermined time. The predetermined time is a different time corresponding to a collection of real-time data.

S506: Calculate a degree of completeness of the real-time data satisfying the same predetermined condition, wherein the degree of completeness is used for indicating a ratio between processed real-time data that satisfies the same predetermined condition and the real-time data aggregated on all the nodes.

Specifically, a progress of processing the real-time data can be known through such percentage. The progress of processing the real-time data can be made more intuitive when the percentage is adopted, and a service party can make a more precise decision according to degree of the completeness of the real-time data.

In implementations, the above degree of completeness may be calculated using a quantity parameter. In other words, the degree of completeness is calculated based on a ratio between an amount of processed real-time data that satisfies the predetermined condition and a total amount of aggregated real-time data that is processed.

It should be noted herein that processing of real-time data may include various types of operations. For example, a relatively simple processing is to collect real-time data. For example, processing of real-time data may be considered to be completed after the real-time data is collected. Apparently, some more complicated processing methods may exist. For example, after collecting real-time data, some treatment(s) of the real-time data is/are required (for example, a format adjustment, a data extraction, or a data aggregation). At that time, the processing can be considered to be completed after the treatment(s) is/are completed.

It should also be noted herein that processing of real-time data is considered to be completed after the real-time data is "collected" in the description of the following embodiments. This is because a level of completeness of the real-time data can be assessed to some extent after the real-time data is collected.

Applying the above embodiment to a tlog product is used as an example hereinafter. According to the above embodiment, the following functions can be implemented. A statistical result of real-time data at current time (in minutes) is assumed to be (1000, 95%), i.e., the quantity of pieces of real-time data that are counted is 1000, and a degree of completeness of these pieces of data is 95% at the current time. Since real-time data is constantly changing, data within 2 minutes after the current time is continuously counted, and the quantity of pieces of real-time data in these 2 minutes is 200. A degree of completeness of data calculated at that time (i.e., a time corresponding to 2 minutes after the current time) is assumed to be 100%, i.e., a statistical result of real-time data corresponding to that time is (1200, 100%). Through the above solution, a service party using the tlog product can perceive an accuracy of the data while ensuring that no data is discarded.

In this example, the quantity is used as a basis for a progress about completion of processing, i.e., a degree of completeness of data is considered to be 100% when 1200 pieces of data are collected.

As can be seen from the solution disclosed in the first embodiment of the present disclosure, real-time data received by one or more nodes in a distributed system is collected, and real-time data satisfying a same predetermined condition on all nodes is aggregated to obtain a corresponding amount of real-time data under the same predetermined condition. A degree of completeness of the real-time data satisfying the same predetermined condition is calculated, thereby realizing a calculation of the degree of completeness of the real-time data.

It is easy to note that a parameter, i.e., a degree of completeness, is introduced in real-time data processing. Through this degree of completeness, a progress of real-time data processing can be known. The degree of completeness is used for indicating a proportion occupied by processed real-time data that satisfies a predetermined condition regarding a progress of aggregated real-time data that is processed. After a degree of completeness is introduced, real-time data can be collected and the collected real-time data can be aggregated. Real-time data satisfying a predetermined condition is then obtained from the aggregated real-time data, and the degree of completeness of the real-time data satisfying the predetermined condition can thereby be calculated, thus achieving an effect of adding an evaluation dimension for real-time data processing.

Therefore, the solution of the first embodiment provided by the present disclosure solves the technical problems of failing to know a progress of real-time data processing in the existing technologies.

In the following embodiments, a degree of completeness of real-time data processing can be evaluated from the following dimension, an amount of real-time data collected over a predetermined period of time, which is somewhat similar to evaluating how much real-time data can be collected over a period of time. Apparently, the degree of completeness can also be evaluated from other perspectives, and included in the scope of protection of the embodiments of the present disclosure, as long as a progress can be displayed or the progress is displayed in terms of a percentage of processing, regardless of what evaluation dimension is selected from any perspective.

According to the above embodiment of the present disclosure, the degree of completeness is used for indicating a ratio between a total amount of processed real-time data satisfying the same predetermined condition and a total amount of real-time data aggregated on all the nodes.

In implementations, the above degree of completeness can be calculated according to a quantity parameter.

According to the above embodiments of the present disclosure, the degree of completeness is used for indicating a ratio between a total amount of the real-time data satisfying the same predetermined condition within a predetermined time period and a total amount of aggregated real-time data on all the nodes, wherein the real-time data satisfying the same predetermined condition is real-time data collected at a predetermined time, and the predetermined time period is a predetermined time period and a time period before the predetermined time.

Specifically, the predetermined time may be a specific time that the degree of completeness of the real-time data needs to be calculated.

In implementations, the degree of completeness of the real-time data may be real-time data obtained at a specific time, a proportion or a progress of real-time data that is processed at and before the specific time.

According to the above embodiments of the present disclosure, after the real-time data received by one or more nodes in the distributed system is collected at S502, the method may further include the following operation.

S508: Obtain a timestamp of each collected piece of real-time data, wherein the timestamp is used for indicating a time for processing the respective piece of real-time data.

In implementations, if the predetermined condition is a time limit, e.g., aggregating 5 minutes of real-time data, a degree of data completeness of real-time data collected at 2 minutes is then needed to be known. After real-time data is collected, a timestamp can be given to each collected piece of real-time data, and the timestamp is used for indicating when the respective piece of real-time data is collected.

According to the above embodiments of the present disclosure, at S506, calculating the degree of completeness of the real-time data that satisfies the same predetermined condition may include the following operation.

S5062: Set a ratio between a total amount of all pieces of real-time data that are processed and a total amount of all pieces of real-time data aggregated on the nodes as the degree of completeness at a current timestamp.

In implementations, after the real-time data is received by one or more nodes, a timestamp of each collected piece of real-time data may be obtained. The number of pieces of real-time data of each timestamp is determined. A ratio between the number of pieces of real-time data that are processed and a total number of pieces of aggregated real-time data is taken as the degree of completeness.

Through the foregoing embodiments, the timestamp of each collected piece of real-time data is obtained, and the number of pieces of real-time data collected within a predetermined time can be obtained intuitively according to timestamps, so that the degree of completeness of the data can be quickly calculated.

According to the foregoing embodiments of the present disclosure, at S504, aggregating the real-time data that satisfies the same predetermined condition on all the nodes to obtain the total amount of real-time data corresponding to the same predetermined condition includes the following operations.

S5042: Obtain real-time data on each distributed node.

S5044: Aggregate obtained pieces of real-time data that have a same timestamp on each distributed node to obtain a respective total number of pieces of real-time data corresponding to each timestamp.

In implementations, each piece of real-time data in a server has a corresponding processing time, and each piece of real-time data is distributed among different nodes. When aggregating real-time data within a predetermined time period, real-time data on each distributed node is obtained within the predetermined time period, and the real-time data on each distributed node is aggregated, i.e., pieces of real-time data with a same corresponding processing time on each distributed node are combined. After an operation of combination, a unified data structure (for example, time: number of files) is generated on each distributed node, and the data structure on the distributed node is then transmitted to a single node. A combination operation is finally performed on the single node, i.e., pieces of real-time data with a same corresponding processing time on each distributed node are combined, and an aggregation result of the real-time data is formed on the single node. The result includes real-time data of multiple processing times, a respective amount of real-time data corresponding to each processing time.

In another optional solution, each piece of real-time data is distributed among different nodes, and pieces of real-time data on each distributed node are aggregated, i.e., the total number of pieces of real-time data within a predetermined time period is obtained, and the time taken for collecting the real-time data in the predetermined time period. Afterwards, aggregation results on each distributed node are combined on a single node to obtain a total amount of aggregated real-time data within the predetermined time and the time taken for collecting the aggregated real-time data.

Through the above embodiments, due to a distributed environment, real-time data on each distributed node is first aggregated, and a combination operation is then performed on a single node. An aggregation result of the real-time data within a predetermined time period is then obtained. Using this solution can achieve the purpose of quickly and accurately aggregating real-time data within a predetermined time period without discarding the data.

Figure 6:
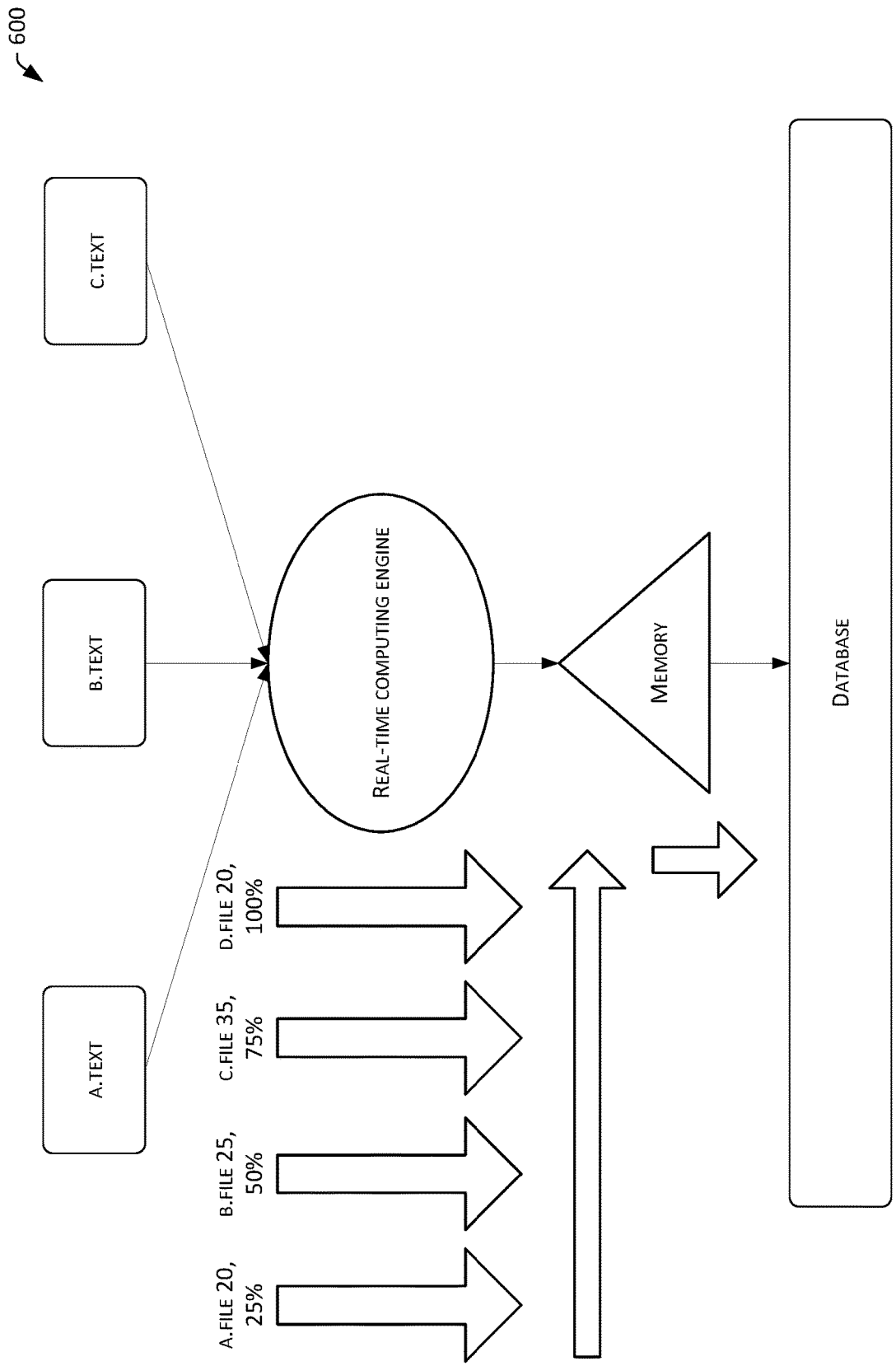
FIG. 6 is a schematic diagram of an optional real-time data processing method according to an embodiment of the present disclosure.

The above embodiments of the present disclosure are described in detail hereinafter using an example of real-time statistics of a degree of completeness of log files generated by a server. As shown in FIG. 6, a schematic diagram of an optional real-time data processing method 600 is provided. A real-time computing engine obtains 20 pieces of real-time data from a file a at the first time, and a degree of completeness that is calculated is 25%. At the second time, 25 pieces of real-time data are obtained from a file b, and a degree of completeness that is calculated is 35%. At the third time, 35 pieces of real-time data are obtained from a file c, and a degree of completeness that is calculated is 75%. At the fourth time, 20 pieces of real-time data are obtained from a file d, and a degree of completeness that is calculated is 100%. When a degree of completeness of the real-time data reaches 100% or 95%, the real-time data and the degree of completeness of the real-time data are stored from a memory to a database.

Figure 7:
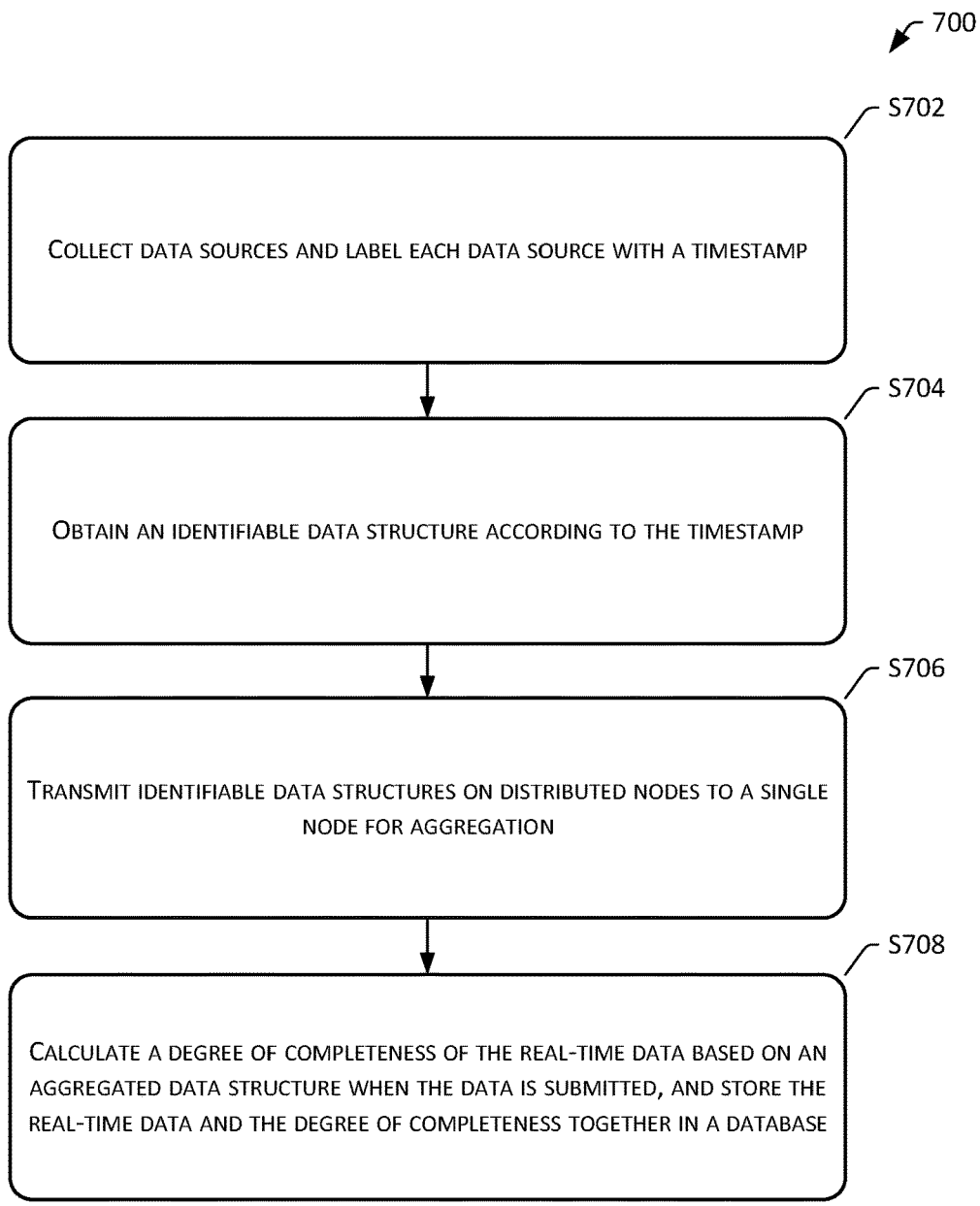
FIG. 7 is a flowchart of an optional real-time data processing method according to an embodiment of the present disclosure.

As shown in FIG. 7, a real-time data processing method 700 may include the following operations.

S702: Collect data sources and label each data source with a timestamp.

In this operation, data sources are collected, i.e., each log file in a distributed environment is collected. Each log file has corresponding processing time when being fetched. For example, a.log, b.log, and c.log respectively represent three log files, and have corresponding processing times (i.e., timestamps as described above) when arriving at a real-time system. These processing times are used for indicating respective times of processing of the log files. As shown in Table 1, a processing time corresponding to a.log is 20160113 13:42:50, a processing time corresponding to b.log is 20160113 13:42:52, and a processing time corresponding to c.log is 20160113 13:42:52.

TABLE 1

| Log file | Processing time |
| --- | --- |
| a.log | 20160113 13:42:50 |
| b.log | 20160113 13:42:52 |
| c.log | 20160113 13:42:52 |

S704: Obtain an identifiable data structure according to the timestamp.

The above data structure is time: number of files. The data structure in Table 1 can be updated to an identifiable data structure according to the timestamp, as shown in Table 2.

TABLE 2

| Time | Number of log files |
| --- | --- |
| 20160113 13:42:50 | 1 (a.log) |
| 20160113 13:42:52 | 2 (including b.log and c.log) |

S706: Transmit identifiable data structures on distributed nodes to a single node for aggregation.

Due to a distributed environment, each distributed node in the distributed environment produces an identifiable data structure (i.e., time: number of files) as described above, and a combination operation is performed on a single node.

For example, the content of an identifiable data structure that is generated on a node A is shown in Table 2.

As shown in Table 2, for a time point of 20160113 13:42:50, the a.log file is being processed and processing thereof is not yet completed. The two files (b.log and c.log) and other files on the A node can be considered to have been completely processed. For a time point of 20160113 13:42:52, the two files (b.log and c.log) are being processed and are not yet processed completely. The other files on the node A can be considered to have been processed completely, and the a.log file is not processed yet. Furthermore, for a time point of 20160113 13:42:49 and previous time point(s), the three files (a.log, b.log, c.log) and the other files on the node A can be considered to have been processed completely.

The content of an identifiable data structure generated on the node B are as shown in Table 3.

TABLE 3

| Time | Number of log files |
| --- | --- |
| 20160113 13:42:51 | 3 (including k.log, m.log, n.log) |
| 20160113 13:42:52 | 5 (including d.log, e.log, f.log, g.log, h.log) |

As shown in Table 3, for a time point of 20160113 13:42:51, three files of k.log, m.log, and n.log are being processed, and are not completely processed yet. The five files (d.log, e.log, f.log, g.log, and h.log) and other files on the node B can be considered to have been processed completely. For a time point of 20160113 13:42:52, the five files (d.log, e.log, f.log, g.log, and h.log) are being processed, and are not completely processed yet. The other files on the node B can be considered to have been processed completely, and the three files (k.log, m.log, and n.log) are not processed yet. Furthermore, for a time point of 20160113 13:42:50 and previous time point(s), the eight files (d.log, e.log, f.log, g.log, h.log, k.log, m.log, and n.log) and other files on the Node B can also be considered to have been processed completely.

The data structures in the A node and the B node are combined, and the content of a data structure generated on a node after combination are shown in Table 4.

TABLE 4

| Time | Number of log files |
|---|---|
| 20160113 13:42:50 | 1 (including a.log in node A) |
| 20160113 13:42:51 | 3 (including k.log, m.log, and n.log in node B) |
| 20160113 13:42:52 | 7 (including b.log and c.log in node A, and d.log, e.log, f.log, g.log, and h.log in node B) |

S708: Calculate a degree of completeness of the real-time data based on an aggregated data structure when the data is submitted, and store the real-time data and the degree of completeness together in a database.

In implementations, a degree of completeness corresponding to each time moment is a degree of completeness corresponding to multiple timestamps. After a degree of completeness is calculated, two indicators, each timestamp and a respective degree of completeness calculated for each timestamp (timestamp, degree of completeness), are stored together in a database, so that each piece of data in the database has a level of completeness of data processing. Based on the level of completeness of the data processing, a processing progress of associated real-time data can be known, and a more precise decision is further made for the real-time data.

It should be noted that the foregoing embodiments only collect log files, i.e., the data sources as described above, and a degree of completeness is calculated based on the collected log files, without describing the number of pieces of real-time data in the data sources. Therefore, no example of how to store two indicators (real-time data and a degree of completeness) together in a database is described in the embodiments of the present disclosure.

According to the data structure on the node after the combination, the degrees of completeness of the real-time data in the embodiments as shown in Tables 1 to 4 above are calculated as follows:

1: At a time moment of 20160113 13:42:53, 11 log files have a timestamp of 20160113 13:42:49. These 11 files with the timestamp of 20160113 13:42:49 are considered to have been processed completely because the minimum time for processing these log files is 20160113 13:42:50, which is larger than 49 seconds. Therefore, the degree of completeness of 49 seconds is 100%.

2: At a time moment of 20160113 13:42:53, 11 files have a timestamp of 20160113 13:42:50. Since 50 seconds is lower than 52 seconds and 51 seconds, among the 11 files with the timestamp of 20160113 13:42:50, the a.log file in the node A is being processed and is not completely processed yet, and the b.log and c.log files in the node A and the d.log, e.log, f.log, g.log, and h.log files in the node B have been processed completely, and the three files k.log, m.log, and n.log in the node B have also been processed completely. Therefore, the number of log files that have been processed completely among the 11 log files with the timestamp of 20160113 13:42:50 is 7+3=10. At this time, the degree of completeness is 10/11=91%.

3: At a time moment of 20160113 13:42:53, for the timestamp is 20160113 13:42:51 is 11 files. Since 51 seconds is between 52 seconds and 50 seconds, for 11 files with a timestamp of 20160113 13:42:51, the a.log file in node A is still not processed, the three files k.log, m.log, and n.log) in node B are being processed, and have not been processed completely, and b.log and c.log in the node A and the five files (d.log, e.log, f.log, g.log, and h.log) in the node B have been processed completely. Therefore, the number of log files that have been processed completely among the 11 log files with the timestamp of 20160113 13:42:51 is 7, and the degree of completeness of all the real-time data for 51 seconds can be obtained as 7/11=63.6%.

4: At a time moment of 20160113 13:42:53, 11 files have a timestamp of 20160113 13:42:52. Since 52 seconds is higher than 51 seconds and 50 seconds, among the 11 files with the timestamp of 20160113 13:42:52, the two files (b.log and c.log) in the node A, and the five files (d.log, e.log, f.log, g.log, and h.log) in the node B are being processed, and is not finished processing yet. The a.log file in the node A and the three files (k.log, m.log, and n.log) in the node B have not been processed yet. Therefore, the 11 log files with the timestamp of 20160113 13:42:52 are considered to have not been completely processed, and the degree of completeness of all the real-time data for 52 seconds is obtained as 0%.

5: At a time moment of 20160113 13:42:53, 11 files have a timestamp of 20160113 13:42:53. Since all log files up to 20160113 13:42:52 are processed, i.e., log files at 53 seconds are not yet collected, a statistical result for 53 seconds of data is 0%.

According to the above method operations, at a time moment of 20160113 13:42:54, degrees of completeness of real-time data for real-time data collected by a number of nodes are calculated:

For the 11 log files with a timestamp of 20160113 13:42:49, the number of log files that have been completely processed is 11, and a degree of completeness of all real-time data for 49 seconds can be obtained as 11/11=100%.

For the 11 log files with a timestamp of 20160113 13:42:50, the number of log files that have been completely processed is 11, and a degree of completeness of all real-time data for 50 seconds can be obtained as 11/11=100%.

For the 11 log files with a timestamp of 20160113 13:42:51, the number of log files that have been completely processed is 8, and a degree of completeness of all real-time data for 51 seconds can be obtained as 8/11=72.3%.

For the 11 log files with a timestamp of 20160113 13:42:52, the number of log files that have been completely processed is 5, and a degree of completeness of all real-time data for 52 seconds can be obtained as 5/11=45.5%.

For the 11 log files with a timestamp of 20160113 13:42:53, the number of log files that have been completely processed is 2, and a degree of completeness of all real-time data for 53 seconds can be obtained as 2/11=18.2%.

For the 11 log files with a timestamp of 20160113 13:42:54, the number of log files that have been completely processed is 0, and a degree of completeness of all real-time data for 54 seconds can be obtained as 0.

According to the above method operations, at a time moment of 20160113 13:42:55, a degree of completeness of real-time data for real-time data collected by a number of nodes is calculated:

For the 11 log files with a timestamp of 20160113 13:42:49, the number of log files that have been processed completely is 11, and a degree of completeness of all real-time data for 49 seconds can be obtained as 11/11=100%.

For the 11 log files with a timestamp of 20160113 13:42:50, the number of log files that have been processed completely is 11, and a degree of completeness of all real-time data for 50 seconds can be obtained as 11/11=100%.

For the 11 log files with a timestamp of 20160113 13:42:51, the number of log files that have been processed completely is 9, and a degree of completeness of all real-time data for 51 seconds can be obtained as 9/11=81.8%.

For the 11 log files with a timestamp of 20160113 13:42:52, the number of log files that have been processed completely is 6, and a degree of completeness of all real-time data for 52 seconds can be obtained as 6/11=54.5%.

For the 11 log files with a timestamp of 20160113 13:42:53, the number of log files that have been processed completely is 4, and a degree of completeness of all real-time data for 53 seconds can be obtained as 4/11=36.4%.

For the 11 log files with a timestamp of 20160113 13:42:54, the number of log files that have been processed completely is 2, and a degree of completeness of all real-time data for 54 seconds can be obtained as 2/11=18.2%.

For the 11 log files with a timestamp of 20160113 13:42:55, the number of log files that have been processed completely is 0, and a degree of completeness of all real-time data for 55 seconds can be obtained as 0.

The embodiments of the present disclosure add a very important attribute to real-time data, i.e., a concept of a degree of completeness is proposed. Each piece of data has a concept of a percentage (0% to 100%), and the percentage is used for representing a level of completeness of that piece of data. Without a degree of completeness of data, a result of real-time data has no concept of progress. In this case, in many quick decision-making areas, it is not known whether a decision can be made based on real-time data. If data is added with a degree of completeness, in particular, real-time data is added with a degree of completeness, a more accurate decision can be made based on the real-time data.

Adding a degree of completeness for real-time data makes real-time data of each timestamp to become (timestamp, degree of completeness), i.e., transforming a single indicator of real-time data into two indicators including real-time data and a degree of completeness of each timestamp. Furthermore, these two indicators are stored together in a database. Functions of a degree of completeness can be applied to the following calculations: real-time calculations in an alarm monitoring system, real-time calculations in a large screen of data, data statistics in tlog products, and real-time calculations in a single-valued aggregation. For real-time calculations in an alarm monitoring system, a level of completeness of processing of each piece of data can be known based on a calculated degree of completeness of each piece of data in order to determine whether to report an alarm, thereby ensuring the accuracy of each instance of alarm. For real-time calculations in a big screen of data, a percentage of a processing progress can be added into current data, to enable service persons and decision makers to make a most precise, fast, and correct decision for such data report. For example, if the revenue brought in by a current advertisement at this minute is 1 million and if a degree of completeness associated with this minute can be determined as 100%, the advertisement can be changed immediately. In a promotion that is time sensitive, such as in an 11.11 event, let more revenue can be brought in by advertising.

A degree of completeness of data can be applied in many fields. For example, due to real-time calculations, current statistical data is constantly changing, such as sales amount data per minute. A service party has no sense about a progress of data processing. Since data is constantly coming in, the embodiments of the present disclosure add a degree of completeness to real-time data for such problem. Based on a calculated degree of completeness of real-time data satisfying a predetermined condition, the real-time data can have a concept of a percentage. The progress of processing of the real-time data can be known using the percentage. For example, a sales amount within preset minutes is always changing. A decision maker can determine whether to change a sales strategy based on a calculated degree of completeness of real-time data that meets a predetermined condition. For another example, for real-time data of an alarm monitoring system, whether to sound an alarm can be determined according to a degree of completeness that is calculated, i.e., a level of completeness of data processing represented by the degree of completeness. Through the above solutions, the problem that a progress of processing of real-time data is not known in the existing technologies is solved, so that a service party can make some more accurate decisions according to a degree of completeness of real-time data.

It should be noted that the foregoing method embodiments are all expressed as series of action combinations for the sake of simple description. One skilled in the art should understand that the present disclosure is not limited by orders of actions that are described, because certain operations may be performed in other orders or in parallel according to the present disclosure. Moreover, one skilled in the art should also understand that the embodiments described in the specification are all exemplary embodiments, and actions and modules involved are not necessarily required by the present disclosure.

Through the description of the above embodiments, one skilled in the art can clearly understand that the methods according to the above embodiments can be implemented by means of software plus a necessary general hardware platform, and apparently can also be implemented by hardware. In many cases, however, the former one is a better implementation. Based on such understanding, the essence of the technical solutions of the present disclosure or the portions that make contributions to the existing technologies may be embodied in a form of a software product. The computer software product is stored in a storage media (such as a ROM/RAM, a disk, an optical disc), and includes a number of instructions to cause a terminal device (which may be a mobile phone, a computer, a server, or a network device, etc.) to perform the methods described in various embodiments of the present disclosure.

Second Embodiment

Figure 8:
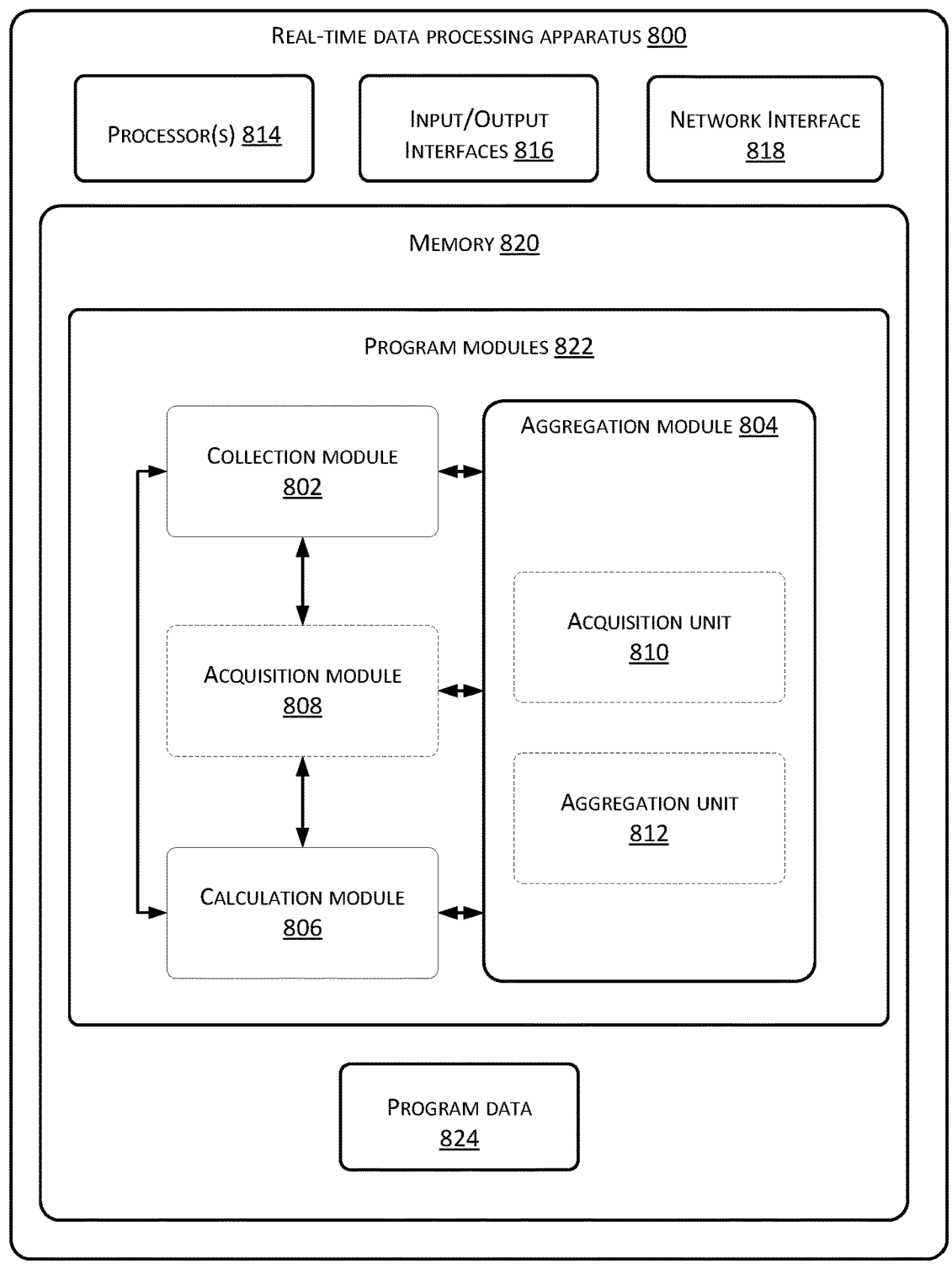
FIG. 8 is a schematic diagram of a real-time data processing apparatus according to an embodiment of the present disclosure.

According to the embodiments of the present disclosure, an embodiment of a real-time data processing apparatus for implementing the real-time data processing method of the first embodiment is further provided. As shown in FIG. 8, the apparatus 800 may include a collection module 802, an aggregation module 804, and a calculation module 806.

The collection module 802 is configured to collect real-time data received by one or more nodes in a distributed system. The aggregation module 804 is configured to aggregate real-time data that satisfies a same predetermined condition on all the nodes to obtain a total amount of real-time data corresponding to the same predetermined condition, wherein the predetermined condition is used for representing a time at which the real-time data is collected. The calculation module 806 is configured to calculate a degree of completeness of the real-time data that satisfies the same predetermined condition, wherein the degree of completeness is used for indicating a ratio between processed real-time data that satisfies the same predetermined conditions and the real-time data aggregated on all the nodes.

Specifically, the real-time data described above may be data that is calculated in real time, and the data is constantly changing with time. The above predetermined condition may be a time limit. The real-time data of the predetermined condition described above may be real-time data collected in predetermined time(s). The predetermined time(s) is/are different time(s) corresponding to a collection of real-time data. The above progress can be a percentage, i.e., a ratio of real-time data that is processed and data that is processed after aggregation. A progress of real-time data processing can be known using the percentage. When a percentage is used, a progress of real-time data processing can be made more intuitive, making it easier for a service party to make a more precise decision based on a degree of completeness of real-time data.

It should be noted herein that processing of real-time data may include various types of operations. For example, a relatively simple processing is to collect real-time data. For example, processing of real-time data may be considered to be completed after the real-time data is collected. Apparently, some more complicated processing methods may exist. For example, after collecting real-time data, some treatment(s) of the real-time data is/are required (for example, a format adjustment, a data extraction, or a data aggregation). At that time, the processing can be considered to be completed after the treatment(s) is/are completed.

It should also be noted that the collection module 802, the aggregation module 804, and the calculation module 806 correspond to operations S502 to S506 in the first embodiment, and examples and application scenarios implemented by these three modules and the corresponding operations are the same, but are not limited to the content disclosed in the first embodiment as described above. It should be noted that the above modules can be operated as a part of the apparatus running in the computer terminal 400 provided in the first embodiment.

As can be seen from the above, in the solutions disclosed in the second embodiment of the present disclosure, real-time data received by one or more nodes in a distributed system is collected, and real-time data satisfying a same predetermined condition on all nodes is aggregated to obtain a corresponding amount of the real-time data satisfying the same predetermined condition. A degree of completeness of the real-time data satisfying the same predetermined condition is calculated, thereby implementing a calculation of the degree of completeness of the real-time data.

It is easy to note that a parameter, i.e., a degree of completeness, is introduced in real-time data processing. Through this degree of completeness, a progress of real-time data processing can be known. The degree of completeness is used for indicating a proportion occupied by processed real-time data that satisfies a predetermined condition with respect to a progress of aggregated real-time data that is processed. After a degree of completeness is introduced, real-time data can be collected and the collected real-time data can be aggregated. Real-time data satisfying a predetermined condition is then obtained from the aggregated real-time data, and the degree of completeness of the real-time data satisfying the predetermined condition can thereby be calculated, thus achieving an effect of adding an evaluation dimension for real-time data processing.

Therefore, the solutions of the foregoing second embodiment provided by the present disclosure solve the technical problem that the existing technologies fail to know a progress of real-time data processing.

A progress can be a percentage, i.e., a ratio between real-time data that is processed and data that is processed after aggregation. A progress of real-time data processing can be known using the percentage. When the percentage is used, a progress of real-time data processing can be made more intuitive, making it easier for a service party to make a more precise decision based on a degree of completeness of real-time data.

Processing of real-time data may include various types of operations. For example, a relatively simple processing is to collect real-time data. For example, processing of real-time data may be considered to be completed after the real-time data is collected. Apparently, some more complicated processing methods may exist. For example, after collecting real-time data, some treatment(s) of the real-time data is/are required (for example, a format adjustment, a data extraction, or a data aggregation). At that time, the processing can be considered to be completed after the treatment(s) is/are completed.

In the description of the following embodiments, processing of real-time data is considered to be completed after the real-time data is "collected". This is because a level of completeness of the real-time data can be assessed to some extent after the real-time data is collected.

In the following embodiments, a degree of completeness of real-time data processing can be evaluated from the following dimension, an amount of real-time data collected over a predetermined period of time, which is somewhat similar to evaluating how much real-time data can be collected over a period of time. Apparently, the degree of completeness can also be evaluated from other perspectives, and included in the scope of protection of the embodiments of the present disclosure, as long as a progress can be displayed or the progress is displayed in terms of a percentage of processing, regardless of what evaluation dimension is selected from any perspective.

According to the above embodiments of the present disclosure, a degree of completeness is used for indicating a ratio between a total amount of processed real-time data satisfying a same predetermined condition and a total amount of real-time data aggregated on all nodes.

In implementations, the degree of completeness can be calculated according to a quantity parameter.

According to the above embodiments of the present disclosure, the degree of completeness is used for indicating a ratio between a total amount of the real-time data satisfying the same predetermined condition within a predetermined time period and a total amount of aggregated real-time data on all the nodes, wherein the real-time data satisfying the same predetermined condition is real-time data collected at a predetermined time, and the predetermined time period is a predetermined time period and a time period before the predetermined time.

Specifically, the predetermined time may be a specific time that the degree of completeness of the real-time data needs to be calculated.

In implementations, the degree of completeness of the real-time data may be real-time data obtained at a specific time, a proportion or a progress of real-time data that is processed at and before the specific time.

According to the above embodiments of the present disclosure, when the predetermined condition includes real-time data collected within a predetermined time, the real-time data processing apparatus 800 further includes an acquisition module 808 as shown in FIG. 8.

The acquisition module 808 is configured to obtain a timestamp of each collected piece of real-time data after collecting the real-time data, where the timestamp is used for indicating a time for processing the respective piece of real-time data.

It should be noted that the acquisition module 808 corresponds to S508 in the first embodiment, and examples and application scenarios implemented by the module and the corresponding operation are the same, and are not limited to the content disclosed in the first embodiment. It should be noted that the above module can be operated as a part of the apparatus in the computer terminal 400 provided in the first embodiment.

Through the foregoing embodiment, each piece of real-time data that is collected is time-stamped, and the number of pieces of real-time data collected in a predetermined time can be intuitively obtained according to respective timestamps, so that a degree of completeness of data can be quickly calculated.

According to the above embodiments of the present disclosure, as shown in FIG. 8, the calculation module 806 is further configured to use a ratio between a total amount of all processed real-time data at a current timestamp and the total amount of the real-time data aggregated on all the nodes as the degree of completeness.

It should be noted that the calculation module 806 corresponds to S5062 in the first embodiment, and examples and application scenarios implemented by the module and the corresponding operation are the same, and are not limited to the content disclosed in the first embodiment. It should be noted that the above module can be operated as a part of the apparatus in the computer terminal 400 provided in the first embodiment.

According to the above embodiments of the present disclosure, as shown in FIG. 8, the aggregation module 806 includes an acquisition unit 810 and an aggregation unit 812.

The acquisition unit 810 is configured to obtain real-time data on each distributed node. The aggregation unit 812 is configured to aggregate pieces of real-time data having a same timestamp that are obtained on each distributed node, and obtain a respective total amount of real-time data corresponding to each timestamp.

It should be noted that the acquisition unit 810 and the aggregation unit 812 correspond to S5042 to S5044 in the first embodiment, and examples and application scenarios implemented by these two modules and the corresponding operations are the same, and are not limited to the content disclosed in the first embodiment. It should be noted that the above modules can be operated as a part of the apparatus in the computer terminal 400 provided in the first embodiment.

In implementations, the apparatus 800 may include one or more processors 814, an input/output (I/O) interface 816, a network interface 818, and memory 820.

The memory 820 may include a form of computer readable media such as a volatile memory, a random access memory (RAM) and/or a non-volatile memory, for example, a read-only memory (ROM) or a flash RAM. The memory 820 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 820 may include program modules 822 and program data 824. The program modules 822 may include one or more modules and/or units as described in the foregoing description and shown in FIG. 8.

Through the above embodiments, due to a distributed environment, real-time data on each distributed node is first aggregated, and a combination operation is then performed on a single node. An aggregation result of the real-time data within a predetermined time period is then obtained. Using this solution can achieve the purpose of quickly and accurately aggregating real-time data within a predetermined time period without discarding the data.

The embodiments of the present disclosure add a very important attribute to real-time data, i.e., a concept of a degree of completeness is proposed. Each piece of data has a concept of a percentage (0% to 100%), and the percentage is used for representing a level of completeness of that piece of data. Without a degree of completeness of data, a result of real-time data has no concept of progress. In this case, in many quick decision-making areas, it is not known whether a decision can be made based on real-time data. If data is added with a degree of completeness, in particular, real-time data is added with a degree of completeness, a more accurate decision can be made based on the real-time data.

A degree of completeness of data can be applied in many fields. For example, due to real-time calculations, current statistical data is constantly changing, such as sales amount data per minute. A service party has no sense about a progress of data processing. Since data is constantly coming in, the embodiments of the present disclosure propose a concept of a degree of completeness, i.e., adding a degree of completeness to real-time data, for such problem. Based on a calculated degree of completeness of real-time data satisfying a predetermined condition, the real-time data can have a concept of a percentage. The progress of processing of the real-time data can be known using the percentage. For example, a sales amount within preset minutes is always changing. A decision maker can determine whether to change a sales strategy based on a calculated degree of completeness of real-time data that meets a predetermined condition. For another example, for real-time data of an alarm monitoring system, whether to sound an alarm can be determined according to a degree of completeness that is calculated, i.e., a level of completeness of data processing represented by the degree of completeness. Through the above solutions, the problem that a progress of processing of real-time data is not known in the existing technologies is solved, so that a service party can make some more accurate decisions according to a degree of completeness of real-time data.

Third Embodiment

The embodiments of the present disclosure may provide a computer terminal. The computer terminal may be any computer terminal device of a computer terminal group. In implementations, in the present embodiment, the computer terminal may also be replaced with a terminal device such as a mobile terminal.

In implementations, in the present embodiment, the computer terminal may be located in at least one network device of a plurality of network devices of a computer network.

In the present embodiment, the computer terminal may execute a program code of the following operations in a real-time data processing method: collecting real-time data received by one or more nodes in a distributed system; and performing an aggregation of real-time data that satisfies a same predetermined condition on all the nodes to obtain a total amount of real-time data corresponding to the same predetermined condition, wherein the predetermined condition is used for representing a time at which the real-time data is collected; and calculating a degree of completeness of the real-time data that satisfies the same predetermined condition, wherein the degree of completeness is used for indicating a ratio between processed real-time data that satisfies the same predetermined conditions and the real-time data aggregated on all the nodes.

Figure 9:
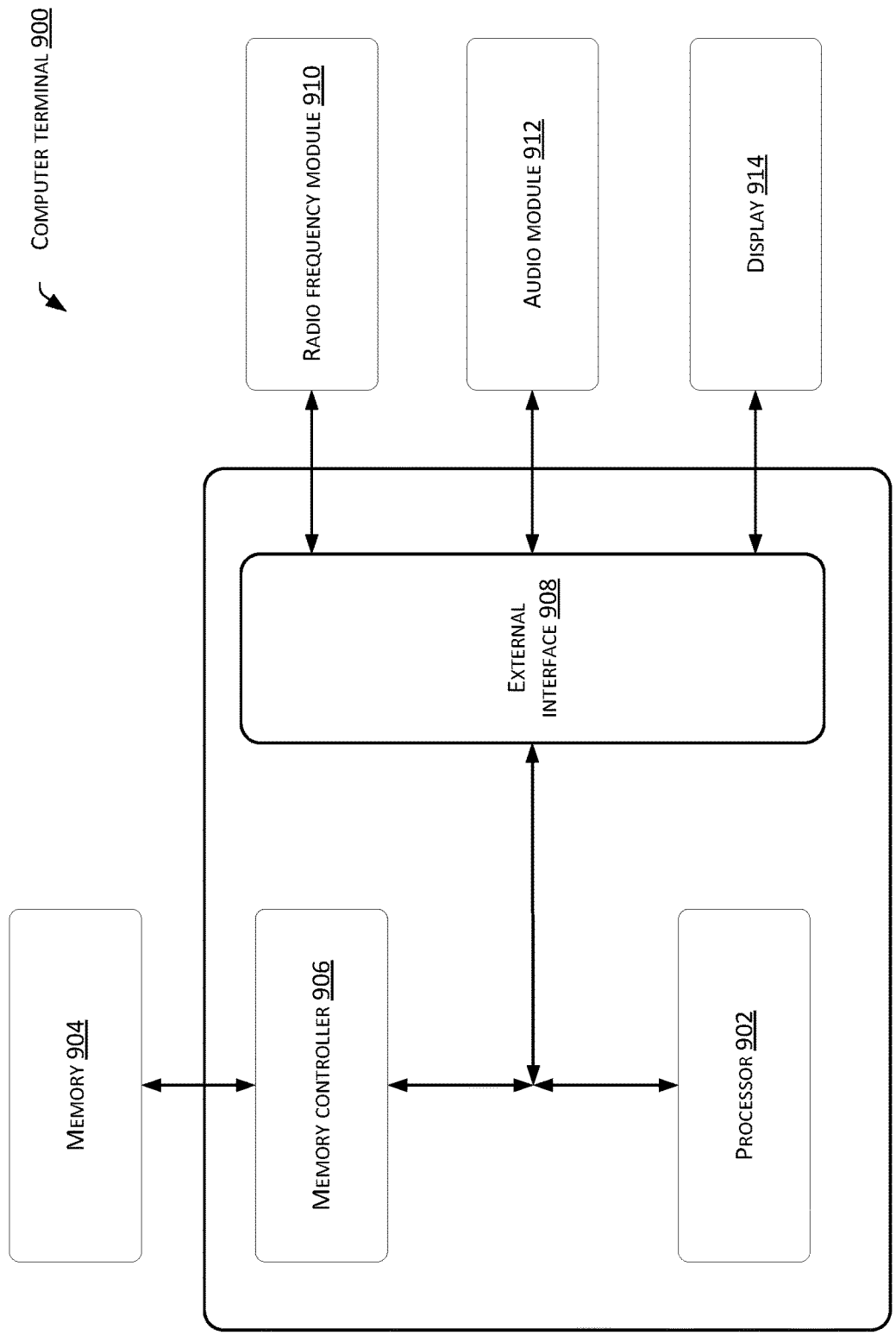
FIG. 9 is a structural block diagram of a computer terminal according to an embodiment of the present disclosure.

FIG. 9 is a structural block diagram of a computer terminal 900 according to an embodiment of the present disclosure. As shown in FIG. 9, the computer terminal 900 may include one or more (only one shown in the figure) processors 902 and a memory 904. The terminal can be understood as a computing terminal, and the computing terminal possesses a certain computing power, which can perform operations and return a result of operation. When operating, the computing terminal can be understood as a service provider. Multiple terminals can jointly perform computing services. The terminal can be a computer, a mobile phone, a tablet, or the like. Apparently, when the terminal is a computer, multiple computers can jointly provide services, and can also be understood as a server group. From another perspective, these devices can also provide cloud computing services.

The memory can be configured to store software programs and modules, such as the program instructions/modules corresponding to real-time data processing methods and apparatuses in the embodiments of the present disclosure. The processor(s) execute(s) various functional applications and data processing by running software program(s) and modules stored in the memory, i.e., implementing the above methods. The memory may include a high speed random access memory, and may also include a non-volatile memory such as one or more magnetic storage devices, a flash memory, or other non-volatile solid state memory. In some examples, the memory can further include storage devices remotely located relative to the processor(s). These storage devices can be connected to the computer terminal 900 over a network. Examples of such network include, but are not limited to, the Internet, an intranet, a local area network, a mobile communication network, and a combination thereof.

The processor(s) may invoke information and an application stored in the memory through the transmission device to perform the following operations: collecting real-time data received by one or more nodes in a distributed system; and performing an aggregation of real-time data that satisfies a same predetermined condition on all the nodes to obtain a total amount of real-time data corresponding to the same predetermined condition, wherein the predetermined condition is used for representing a time at which the real-time data is collected; and calculating a degree of completeness of the real-time data that satisfies the same predetermined condition, wherein the degree of completeness is used for indicating a ratio between processed real-time data that satisfies the same predetermined conditions and the real-time data aggregated on all the nodes.

In implementations, the processor(s) may further execute program codes of the following operations: the degree of completeness being used for indicating a ratio between a total amount of the processed real-time data that satisfies the same predetermined conditions and a total amount of the real-time data aggregated on all the nodes.

In implementations, the processor(s) may further execute program codes of the following operations: the completeness being used to indicating a proportion of the total amount of real-time data on aggregated all the nodes that is occupied by a total amount of real-time data that satisfies the same predetermined condition in a predetermined time period, wherein the real-time data that satisfies the same predetermined condition is real-time data collected at a predetermined time, and the predetermined time period is the predetermined time and a time period before the predetermined time.

In implementations, the processor(s) may further execute program codes of the following operations: obtaining a timestamp of each collected piece of real-time data after collecting the real-time data received by the one or more nodes in the distributed system, wherein the timestamp is used for indicating a time when the respective piece of real-time data is processed.

In implementations, the processor(s) may further execute program codes of the following operations: using a ratio between a total amount of all processed real-time data at a current timestamp and the total amount of the real-time data aggregated on all the nodes as the degree of completeness.

In implementations, the processor(s) may further execute program codes of the following operations: obtaining real-time data on each distributed node; and aggregating pieces of real-time data having a same timestamp that are obtained on each distributed node to obtain a respective total amount of real-time data corresponding to each timestamp.

In the embodiments of the present disclosure, real-time data received by one or more nodes in a distributed system is collected, and real-time data satisfying a same predetermined condition on all the nodes is aggregated. A total amount of real-time data corresponding to the same predetermined condition is obtained, and a degree of completeness of the real-time data satisfying the same predetermined conditions is calculated, thereby realizing a calculation of the degree of completeness of the real-time data.

It is easy to note that a parameter, i.e., a degree of completeness, is introduced in real-time data processing. Through this degree of completeness, a progress of real-time data processing can be known. The degree of completeness is used for indicating a proportion occupied by processed real-time data that satisfies a predetermined condition with respect to a progress of aggregated real-time data that is processed. After a degree of completeness is introduced, real-time data can be collected and the collected real-time data can be aggregated. Real-time data satisfying a predetermined condition is then obtained from the aggregated real-time data, and the degree of completeness of the real-time data satisfying the predetermined condition can thereby be calculated, thus achieving an effect of adding an evaluation dimension for real-time data processing.

Therefore, the embodiments of the present disclosure solve the technical problem that the existing technologies cannot know the progress of real-time data processing.

One skilled in the art can understand that the structure shown in FIG. 9 is only an illustration, and the computer terminal can also be a terminal device, such as a smart phone (such as an Android mobile phone, an iOS mobile phone, etc.), a tablet computer, a handheld computer, and a mobile Internet device (MID), a PAD, etc. FIG. 9 does not impose any limitations on the structure of the above electronic device. For example, the computer terminal 900 may also include a memory controller 906, an external interface 908, a radio frequency module 910, an audio module 912, a display 914, etc. In some embodiments, the computer terminal 900 may also include more or fewer components (such as a network interface, etc.) than the one shown in FIG. 9, or have a configuration different from that shown in FIG. 9. The computer of FIG. 9 can also be used as a server to provide external services.

One of ordinary skill in the art may understand that all or part of the operations of each method of the foregoing embodiments may be completed by a program to instruct related hardware of a terminal device. The program may be stored in a computer readable storage media, and the storage media may include a flash disk, a read-only memory (ROM), a random access memory (RAM), a magnetic disk, or an optical disk, etc.

Fourth Embodiment

The embodiments of the present disclosure also provide a storage media. In implementations, in the present embodiment, the storage media may be configured to store program codes executed by the real-time data processing methods provided in the first embodiment as described above.

In implementations, in the present embodiment, the storage media may be located in any computer terminal of a computer terminal group in a computer network, or in any mobile terminal of a mobile terminal group.

In implementations, in the present embodiment, the storage media is configured to store program codes for performing the following operations: collecting real-time data received by one or more nodes in a distributed system; and performing an aggregation of real-time data that satisfies a same predetermined condition on all the nodes to obtain a total amount of real-time data corresponding to the same predetermined condition, wherein the predetermined condition is used for representing a time at which the real-time data is collected; and calculating a degree of completeness of the real-time data that satisfies the same predetermined condition, wherein the degree of completeness is used for indicating a ratio between processed real-time data that satisfies the same predetermined conditions and the real-time data aggregated on all the nodes.

In implementations, the storage media is further configured to store program codes for performing the following operations: the degree of completeness being used for indicating a ratio between a total amount of the processed real-time data that satisfies the same predetermined conditions and a total amount of the real-time data aggregated on all the nodes.

In implementations, the storage media is further configured to store program codes for performing the following operations: the completeness being used to indicating a proportion of the total amount of real-time data on aggregated all the nodes that is occupied by a total amount of real-time data that satisfies the same predetermined condition in a predetermined time period, wherein the real-time data that satisfies the same predetermined condition is real-time data collected at a predetermined time, and the predetermined time period is the predetermined time and a time period before the predetermined time.

In implementations, the storage media is further configured to store program codes for performing the following operations: obtaining a timestamp of each collected piece of real-time data after collecting the real-time data received by the one or more nodes in the distributed system, wherein the timestamp is used for indicating a time when the respective piece of real-time data is processed.

In implementations, the storage media is further arranged to store program codes for performing the following operations: using a ratio between a total amount of all processed real-time data at a current timestamp and the total amount of the real-time data aggregated on all the nodes as the degree of completeness.

In implementations, the storage media is further configured to store program codes for performing the following operations: obtaining real-time data on each distributed node; and aggregating pieces of real-time data having a same timestamp that are obtained on each distributed node to obtain a respective total amount of real-time data corresponding to each timestamp.

Serial numbers of the embodiments of the present disclosure are merely used for description, and do not represent advantages and disadvantages of the embodiments.

In the foregoing embodiments of the present disclosure, descriptions of various embodiments have different emphases, and a portion of a certain embodiment that is not described in detail can be referenced to related descriptions of other embodiments.

In the embodiments provided by the present disclosure, it should be understood that the disclosed technical content may be implemented in other manners. The apparatus embodiments described above are only illustrative. For example, a division of units may be a division of logical functions. In practical implementation, other manners of division may exist. For example, multiple units or components may be combined or integrated into another system, or some features can be ignored or not executed. In addition, a mutual coupling or direct coupling or communication connection that is shown or discussed may be an indirect coupling or communication connection through some interface(s), unit(s) or module(s), and may be in an electrical or other form.

The units described as separate components may or may not be physically separated, and components displayed as units may or may not be physical units, i.e., may be located in a single place, or may be distributed among multiple units. Some or all of the units may be selected according to actual needs to achieve the purpose of the solution(s) of the embodiment(s).

In addition, various functional units in each embodiment of the present disclosure may be integrated into a single processing unit, or each unit may exist as individual entity physically, or two or more units may be integrated into a single unit. The above integrated unit can be implemented in a form of hardware or in a form of a software functional unit.

The integrated unit, if implemented in a form of a software functional unit and sold or used as a standalone product, may be stored in a computer readable storage media. Based on such understanding, the essence of the technical solutions of the present disclosure, or contributions made to the existing technologies, or all or part of the technical solutions may be embodied in a form of a software product. The computer software product is stored in a storage media, and includes a number of instructions to cause a computing device (which may be a personal computer, a server, or a network device, etc.) to perform all or part of the operations of the methods described in various embodiments of the present disclosure. The storage media includes various types of media that are capable of storing program codes, such as a U disk, a Read-Only Memory (ROM), a Random Access Memory (RAM), a removable hard disk, a magnetic disk, or an optical disk, etc.

The above description corresponds to exemplary embodiments of the present disclosure only. It should be noted that one skilled in the art can also make a number of improvements and polishing without departing from the principles of the present disclosure. These improvements and polishing should be considered to fall in the scope of protection of the present disclosure.

The present disclosure can further be understood using the following clauses.

Clause 1: A real-time data processing method comprising: collecting real-time data received by one or more nodes in a distributed system; aggregating real-time data that satisfies a same predetermined condition on all the nodes to obtain a total amount of real-time data corresponding to the same predetermined condition, wherein the predetermined condition is used for representing a time at which the real-time data is collected; and calculating a degree of completeness of the real-time data that satisfies the same predetermined condition, wherein the degree of completeness is used for indicating a ratio between processed real-time data that satisfies the same predetermined conditions and the real-time data aggregated on all the nodes.

Clause 2: The method of Clause 1, wherein the degree of completeness is used for indicating a ratio between a total amount of the processed real-time data that satisfies the same predetermined conditions and a total amount of the real-time data aggregated on all the nodes.

Clause 3: The method of Clause 2, wherein the degree of completeness is used to indicating a proportion of the total amount of real-time data on aggregated all the nodes that is occupied by a total amount of real-time data that satisfies the same predetermined condition within a predetermined time period, wherein the real-time data that satisfies the same predetermined condition is real-time data collected at a predetermined time, and the predetermined time period is the predetermined time and a time period before the predetermined time.

Clause 4: The method of Clause 3, wherein: after collecting the real-time data received by the one or more nodes in the distributed system, the method further comprises obtaining a timestamp of each collected piece of real-time data after collecting the real-time data received by the one or more nodes in the distributed system, wherein the timestamp is used for indicating a time when the respective piece of real-time data is processed.

Clause 5: The method of Clause 4, wherein calculating the degree of completeness of the real-time data that satisfies the same predetermined condition comprises using a ratio between a total amount of all processed real-time data at a current timestamp and the total amount of the real-time data aggregated on all the nodes as the degree of completeness.

Clause 6: The method of any one of Clauses 1-5, wherein aggregating the real-time data that satisfies the same predetermined condition on all the nodes to obtain the total amount of real-time data corresponding to the same predetermined condition comprises: obtaining real-time data on each distributed node; and aggregating pieces of real-time data having a same timestamp that are obtained on each distributed node to obtain a respective total amount of real-time data corresponding to each timestamp.

Clause 7: A real-time data processing apparatus comprising: a collection module configured to collect real-time data received by one or more nodes in a distributed system; an aggregation module configured to aggregate real-time data that satisfies a same predetermined condition on all the nodes to obtain a total amount of real-time data corresponding to the same predetermined condition, wherein the predetermined condition is used for representing a time at which the real-time data is collected; and a calculation module configured to calculate a degree of completeness of the real-time data that satisfies the same predetermined condition, wherein the degree of completeness is used for indicating a ratio between processed real-time data that satisfies the same predetermined conditions and the real-time data aggregated on all the nodes.

Clause 8: The apparatus of Clause 7, wherein the degree of completeness is used for indicating a ratio between a total amount of the processed real-time data that satisfies the same predetermined conditions and a total amount of the real-time data aggregated on all the nodes.

Clause 9: The apparatus of Clause 8, wherein the degree of completeness is used to indicating a proportion of the total amount of real-time data on aggregated all the nodes that is occupied by a total amount of real-time data that satisfies the same predetermined condition within a predetermined time period, wherein the real-time data that satisfies the same predetermined condition is real-time data collected at a predetermined time, and the predetermined time period is the predetermined time and a time period before the predetermined time.

Clause 10: The apparatus of Clause 9, further comprising an acquisition module configured to obtain a timestamp of each collected piece of real-time data after collecting the real-time data, where the timestamp is used for indicating a time for processing the respective piece of real-time data.

Clause 11: The apparatus of Clause 10, wherein the calculation module is further configured to use a ratio between a total amount of all processed real-time data at a current timestamp and the total amount of the real-time data aggregated on all the nodes as the degree of completeness.

Clause 12: The apparatus of any one of Clauses 7-11, wherein the aggregation module comprises: an acquisition unit configured to obtain real-time data on each distributed node; and an aggregation unit configured to aggregate pieces of real-time data having a same timestamp that are obtained on each distributed node, and obtain a respective total amount of real-time data corresponding to each timestamp.

What is claimed is:

1. A method for maximizing an advertisement revenue implemented by one or more computing devices, the method comprising:
  collecting real-time data received by one or more nodes in a distributed system, each collected piece of real-time data being associated with a respective timestamp;
  aggregating real-time data that satisfies a same predetermined condition on the one or more nodes to obtain a total amount of real-time data corresponding to the same predetermined condition;
  calculating a degree of completeness of the real-time data that satisfies the same predetermined condition, wherein the degree of completeness is used for indicating a ratio between processed real-time data that satisfies the same predetermined condition and the real-time data aggregated on the one or more nodes, and is a basis for indicating a progress about a completion of processing;
  adding the degree of completeness for the real-time data that satisfies the same predetermined condition to transform an indicator of the real-time data that satisfies the same predetermined condition into two indicators, the two indicators including a timestamp of the real-time data that satisfies the same predetermined condition and the degree of completeness;
  storing the degree of completeness and the timestamp of the real-time data that satisfies the same predetermined condition together in a database; and changing a current advertisement based at least in part on the degree of completeness and the real-time data that satisfies the same predetermined condition.

2. The method of claim 1, wherein the degree of completeness is used for indicating a ratio between a total amount of the processed real-time data that satisfies the same predetermined conditions and a total amount of the real-time data aggregated on the one or more nodes.

3. The method of claim 2, wherein the degree of completeness is used to indicating a proportion of the total amount of real-time data on aggregated the one or more nodes that is occupied by a total amount of real-time data that satisfies the same predetermined condition within a predetermined time period, wherein the real-time data that satisfies the same predetermined condition comprises real-time data collected at a predetermined time, and the predetermined time period is the predetermined time and a time period before the predetermined time.

4. The method of claim 3, wherein: after collecting the real-time data received by the one or more nodes in the distributed system, the method further comprises obtaining a timestamp of each collected piece of real-time data after collecting the real-time data received by the one or more nodes in the distributed system, wherein the timestamp is used for indicating a time when the respective piece of real-time data is processed.

5. The method of claim 4, wherein calculating the degree of completeness of the real-time data that satisfies the same predetermined condition comprises using a ratio between a total amount of processed real-time data at a current timestamp and the total amount of the real-time data aggregated on the one or more nodes as the degree of completeness.

6. The method of claim 1, wherein aggregating the real-time data that satisfies the same predetermined condition on the one or more nodes to obtain the total amount of real-time data corresponding to the same predetermined condition comprises:
obtaining real-time data on each node of the distributed system; and
aggregating pieces of real-time data having a same timestamp that are obtained on each node of the distributed system to obtain a respective total amount of real-time data corresponding to each timestamp.

7. The method of claim 1, wherein the predetermined condition is used for representing a time at which the real-time data is collected.

8. An apparatus for maximizing an advertisement revenue, the apparatus comprising:
one or more processors;
memory;
a collection module stored in the memory and executable by the one or more processors to collect real-time data received by one or more nodes in a distributed system, each collected piece of real-time data being associated with a respective timestamp;
an aggregation module stored in the memory and executable by the one or more processors to aggregate real-time data that satisfies a same predetermined condition on the one or more nodes to obtain a total amount of real-time data corresponding to the same predetermined condition; and
a calculation module stored in the memory and executable by the one or more processors to:
calculate a degree of completeness of the real-time data that satisfies the same predetermined condition, wherein the degree of completeness is used for indicating a ratio between processed real-time data that satisfies the same predetermined conditions and the real-time data aggregated on the one or more nodes, and is a basis for indicating a progress about a completion of processing;
add the degree of completeness for the real-time data that satisfies the same predetermined condition to transform an indicator of the real-time data that satisfies the same predetermined condition into two indicators, the two indicators including a timestamp of the real-time data that satisfies the same predetermined condition and the degree of completeness;
store the degree of completeness and the timestamp of the real-time data that satisfies the same predetermined condition together in a database; and
changing a current advertisement based at least in part on the degree of completeness and the real-time data that satisfies the same predetermined condition.

9. The apparatus of claim 8, wherein the degree of completeness is used for indicating a ratio between a total amount of the processed real-time data that satisfies the same predetermined conditions and a total amount of the real-time data aggregated on the one or more nodes.

10. The apparatus of claim 9, wherein the completeness is used to indicating a proportion of the total amount of real-time data on aggregated the one or more nodes that is occupied by a total amount of real-time data that satisfies the same predetermined condition within a predetermined time period, wherein the real-time data that satisfies the same predetermined condition comprises real-time data collected at a predetermined time, and the predetermined time period is the predetermined time and a time period before the predetermined time.

11. The apparatus of claim 10, further comprising an acquisition module configured to obtain a timestamp of each collected piece of real-time data after collecting the real-time data, where the timestamp is used for indicating a time for processing the respective piece of real-time data.

12. The apparatus of claim 11, wherein the calculation module is further configured to use a ratio between a total amount of processed real-time data at a current timestamp and the total amount of the real-time data aggregated on the one or more nodes as the degree of completeness.

13. The apparatus of claim 8, wherein the aggregation module comprises:
an acquisition unit configured to obtain real-time data on each node of the distributed system; and
an aggregation unit configured to aggregate pieces of real-time data having a same timestamp that are obtained on each node of the distributed system, and obtain a respective total amount of real-time data corresponding to each timestamp.

14. The apparatus of claim 8, wherein the predetermined condition is used for representing a time at which the real-time data is collected.

15. One or more computer readable media storing executable instructions that, when executed by one or more processors of a system for maximizing an advertisement revenue, cause the one or more processors to perform acts comprising:
collecting real-time data received by one or more nodes in a distributed system, each collected piece of real-time data being associated with a respective timestamp;
aggregating real-time data that satisfies a same predetermined condition on the one or more nodes to obtain a total amount of real-time data corresponding to the same predetermined condition;

calculating a degree of completeness of the real-time data that satisfies the same predetermined condition, wherein the degree of completeness is used for indicating a ratio between processed real-time data that satisfies the same predetermined condition and the real-time data aggregated on the one or more nodes, and is a basis for indicating a progress about a completion of processing;

adding the degree of completeness for the real-time data that satisfies the same predetermined condition to transform an indicator of the real-time data that satisfies the same predetermined condition into two indicators, the two indicators including a timestamp of the real-time data that satisfies the same predetermined condition and the degree of completeness;

storing the degree of completeness and the timestamp of the real-time data that satisfies the same predetermined condition together in a database; and changing a current advertisement based at least in part on the degree of completeness and the real-time data that satisfies the same predetermined condition.

16. The one or more computer readable media of claim 15, wherein the degree of completeness is used for indicating a ratio between a total amount of the processed real-time data that satisfies the same predetermined conditions and a total amount of the real-time data aggregated on the one or more nodes.

17. The one or more computer readable media of claim 16, wherein the degree of completeness is used to indicating a proportion of the total amount of real-time data on aggregated the one or more nodes that is occupied by a total amount of real-time data that satisfies the same predetermined condition within a predetermined time period, wherein the real-time data that satisfies the same predetermined condition comprises real-time data collected at a predetermined time, and the predetermined time period is the predetermined time and a time period before the predetermined time.

18. The one or more computer readable media of claim 17, wherein: after collecting the real-time data received by the one or more nodes in the distributed system, the method further comprises obtaining a timestamp of each collected piece of real-time data after collecting the real-time data received by the one or more nodes in the distributed system, wherein the timestamp is used for indicating a time when the respective piece of real-time data is processed.

19. The one or more computer readable media of claim 18, wherein calculating the degree of completeness of the real-time data that satisfies the same predetermined condition comprises using a ratio between a total amount of processed real-time data at a current timestamp and the total amount of the real-time data aggregated on the one or more nodes as the degree of completeness.

20. The one or more computer readable media of claim 15, wherein aggregating the real-time data that satisfies the same predetermined condition on the one or more nodes to obtain the total amount of real-time data corresponding to the same predetermined condition comprises:

obtaining real-time data on each node of the distributed system; and aggregating pieces of real-time data having a same timestamp that each node of the distributed system to obtain a respective total amount of real-time data corresponding to each timestamp.

* * * * *